(12) United States Patent
Huang et al.

(10) Patent No.: US 8,712,681 B2
(45) Date of Patent: Apr. 29, 2014

(54) HIGH SAFETY VEHICULAR TRANSPORTATION SYSTEM AND OPERATIONAL METHOD THEREOF

(75) Inventors: Shih-Chia Huang, Taipei (TW); Ming-Kai Jiau, Taipei (TW); Bo-Hao Chen, Taipei (TW); Chih-Hsian Lin, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 13/371,118

(22) Filed: Feb. 10, 2012

(65) Prior Publication Data

US 2013/0035846 A1    Feb. 7, 2013

(30) Foreign Application Priority Data

Aug. 3, 2011    (TW) .............................. 100127513 A

(51) Int. Cl.
*G01C 21/00* (2006.01)
*G06Q 50/00* (2012.01)
*G08B 21/02* (2006.01)

(52) U.S. Cl.
USPC ............................... 701/408; 705/6; 340/689

(58) Field of Classification Search
USPC ............ 701/408; 705/8, 6; 706/13; 345/833; 340/540, 689; 180/271
See application file for complete search history.

(56) References Cited

U.S. PATENT DOCUMENTS

| 5,897,629 | A | * | 4/1999 | Shinagawa et al. | ............. 706/13 |
| 7,062,376 | B2 | | 6/2006 | Oesterling | |
| 7,330,840 | B2 | * | 2/2008 | Straatveit | ......................... 706/13 |
| 2003/0095151 | A1 | * | 5/2003 | Shackleford et al. | ......... 345/833 |
| 2004/0225544 | A1 | * | 11/2004 | Camer | ............................. 705/8 |
| 2008/0180243 | A1 | * | 7/2008 | Aaron | ........................... 340/540 |
| 2008/0277183 | A1 | * | 11/2008 | Huang et al. | .................. 180/271 |

* cited by examiner

*Primary Examiner* — Fadey Jabr
*Assistant Examiner* — Aaron L Troost
(74) *Attorney, Agent, or Firm* — Jianq Chyun IP Office

(57) ABSTRACT

A high safety vehicular transportation system is used in an individual carpool car with at least one user and comprises a user module, a rescue unit and a server center. The user module stores and provides carpool data, stores and provides states of individual carpool car, submits a carpool request and comprises a save our soul (SOS) system. The SOS system transmits a distress signal. The rescue unit provides emergency rescue assistance if any user is in a dangerous situation. The server center receives, stores and provides carpool data, has an instantaneous tracking capability, provides carpool service to at least one user, calls the rescue unit if the server center receives the distress signal, receives the carpool request and generates at least one carpool mission to fulfill the carpool request. An operational method for a high safety vehicular transportation system is also disclosed.

17 Claims, 6 Drawing Sheets

HIGH SAFETY VEHICULAR TRANSPORTATION SYSTEM AND OPERATIONAL METHOD THEREOF

CROSS-REFERENCE TO RELATED APPLICATIONS

This non-provisional application claims priority under 35 U.S.C. §119(a) on Patent Application No. 100127513 filed in Taiwan, R.O.C. on Aug. 3, 2011, the entire contents of which are hereby incorporated by reference.

FIELD OF THE INVENTION

The present invention is a high safety vehicular transportation system and an operational method.

BACKGROUND OF THE INVENTION

Carpooling is commuting in groups, so several passengers can travel to desired destinations in a single vehicle. Carpooling reduces individual commuting costs by sharing travel expenses, such as fuel, tolls and car rental among people in a particular carpool. It is also a more environmentally friendly and sustainable way to travel because carpooling reduces carbon emissions and traffic and requires fewer parking spaces. Carpool administrators can dispatch a carpool car to at least one carpool user.

U.S. Pat. No. 7,062,376 discloses a method and system for providing car-pooling assistance using a wireless communication system. The method includes steps of receiving a user carpool enrollment request, obtaining a location of users' moving vehicles, storing the location as a route in a call center database and sending at least one available match based on the carpool enrollment requests to the user.

However, a carpool user using the previous method and system does not know any information about other carpool users before boarding the carpool car and cannot obtain rescue if a carpool user is in a dangerous situation.

Accordingly, a new high safety vehicular transportation system and an operational method are needed to overcome the foregoing problems.

SUMMARY OF THE INVENTION

The primary objective of the present invention is to inform members of a carpool of information about other users before boarding a carpool car and allow members to obtain rescue assistance if a user is in a dangerous situation.

A high safety vehicular transportation system in accordance with the present invention is used in an individual carpool car with at least one user and comprises a user module, a rescue unit and a server center.

The user module stores and provides carpool data and stores and provides states of individual carpool cars, submits a carpool request and comprises a save our soul (SOS) system. The SOS system transmits a distress signal.

The rescue unit is connected to the user module and provides emergency rescue assistance if any user is in a dangerous situation and is not in the carpool car.

The server center is connected to the user module and the rescue unit, receives, stores and provides carpool data, has an instantaneous tracking capability, provides carpool service to at least one user, calls the rescue unit if the server center receives the distress signal, receives the carpool request, generates at least one carpool mission to fulfill the carpool request and transmits the carpool mission to the user module.

An operational method for a high safety vehicular transportation system consisting of a user module, a rescue unit and a server center in accordance with the present invention is used in at least one carpool car with at least one user and comprises steps of submitting a carpool request from a user, generating a carpool route according to the carpool request, generating at least one carpool mission to fulfill the carpool request, choosing and executing a carpool mission for the user, determining whether any user is in a dangerous situation and calling the rescue unit if a user is in a dangerous situation.

DETAILED DESCRIPTION OF THE PRESENT INVENTION

Figure 1:
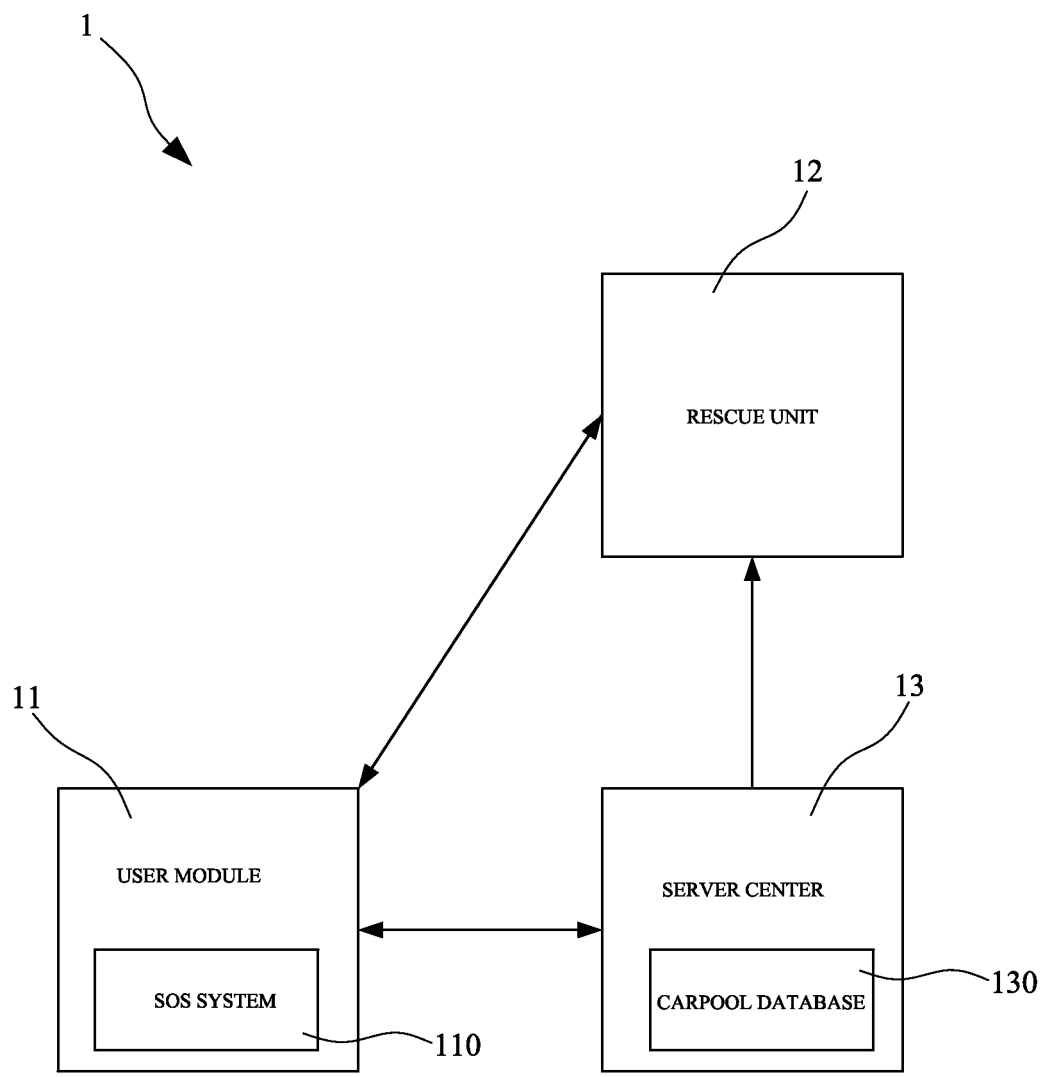
FIG. 1 is a functional block diagram of a high safety vehicular transportation system in accordance with the present invention.

With reference to FIG. 1, a high safety vehicular transportation system (1) in accordance with the present invention is used in an individual carpool car with at least one user and comprises a user module (11), a rescue unit (12) and a server center (13).

A user may be at least one carpool passenger or a carpool driver.

The user module (11) stores and provides carpool data, stores and provides states of individual carpool cars, submits a carpool request, comprises a save our soul (SOS) system (110) that transmits a distress signal, and may be a mobile device, a cell phone, a tablet personal computer or a laptop computer, and may be used to evaluate other users in the carpool car, can connect to an Internet and have a global positioning system navigation device, an identification, a counter, an sound input unit and an acceleration unit and uses the operation of instinct to call the rescue unit (12) if the server center (13) receiving the distress signal from the user module (11).

The counter has a time interval and a danger trigger threshold. The acceleration unit measures an angle value and a three dimension displacement value. The sound input unit receives sound signal. The danger trigger threshold increases if the sound value is greater than a decibel trigger threshold, or the angle value is greater than an angle trigger threshold and the three dimension displacement value is greater than a displacement trigger threshold. If the danger trigger threshold is greater than a standard value, the SOS system (110) transmits the distress signal to the server center (13).

The SOS system (110) may be manually turn on by the user on the user module (11) when the user walks or gets on the mass rapid transit (MRT), get on a bus or get in a taxi.

The SOS system (110) may be automatically turn on when the user gets into the carpool car, uses the operation of instinct to transmit a distress signal for the emergency rescue assistance if the dangerous situation occurred and transmits a distress signal to rescue unit by using a shaking of instinct or a shouting of instinct.

The shaking of instinct is the user shaking the user module (11). The shouting of instinct is the user shouting the user module (11).

The rescue unit (12) is connected to the user module (11), provides emergency rescue assistance if any user is in a dangerous situation, is not in the carpool car and may be a police office.

The dangerous situation may be a carpool car not complying with the carpool route or a user calling for help through the user module (11).

The server center (13) is connected to the user module (11) and the rescue unit (12), receives, stores and provides carpool data, has an instantaneous tracking capability, provides carpool service to at least one user and calls the rescue unit (12) if server center (13) receives the distress signal, receives the carpool request, generates at least one carpool mission to fulfill the carpool request and transmits the carpool mission to the user module (11), may have an instantaneous tracking capability, comprise a carpool database (130) that saves carpool data and may dispatch carpool missions, generate a carpool route, provide safety for embarked users, listens for any carpool request is send from the user at any time, processing to calculate the matching result and return the result back to the user that send the request signal. All carpool cars are connected to a single server center (13).

The carpool request has name, gender, interest and evaluation of the user in the carpool car and departure location, destination, a number of passengers, position of the carpool car and destination of the carpool car, the server center (13) dispatches carpool missions, generates a carpool route according to the departure location, destination, position of the carpool car and destination of the carpool car and provides safety for embarked.

The carpool route may be generated by a technique selected from a group consisting of a Monte Carlo Algorithm, a Simulated Annealing Algorithm, a Genetic Algorithm, a Tabu Search, an ANT Algorithm, Neural Networks and Particle Swarm Optimization.

The matching result is generated by the Genetic Algorithm and the Fuzzy Logic Control, the request of the user is encoded in the form of a chromosome-like structure, and then routing evolution will be executed through the crossover and mutation operations, and then using the fitness function to evaluate the distance of routing to find the chromosome with the least distance as the parents and generating the better offspring after evolution process, in the end, to find the approximately optimal solution as the carpool match result.

The Fuzzy Logic Control is used to adaptively adjust the Genetic Algorithm parameter, evaluating the characteristic of match result by the Fuzzy Control Logic Algorithm and generating the change of crossover rate and mutation rate of Genetic Algorithm parameter in order to speed up the convergence of the evolutionary processes and improve the performance and reduce the computing time.

Figure 2:
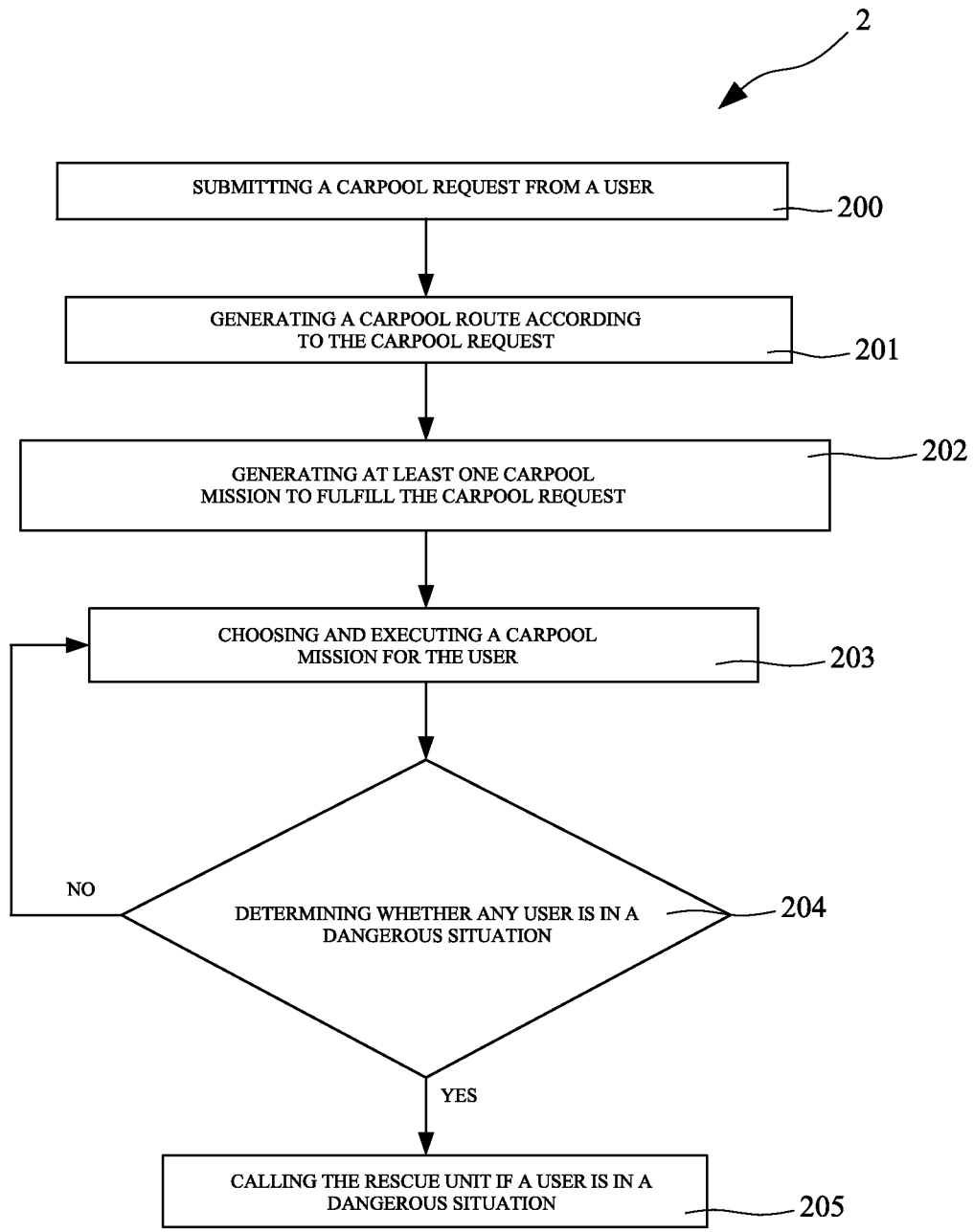
FIG. 2 is a flowchart of a first embodiment of an operational method for a high safety vehicular transportation system in accordance with the present invention.
Figure 3:
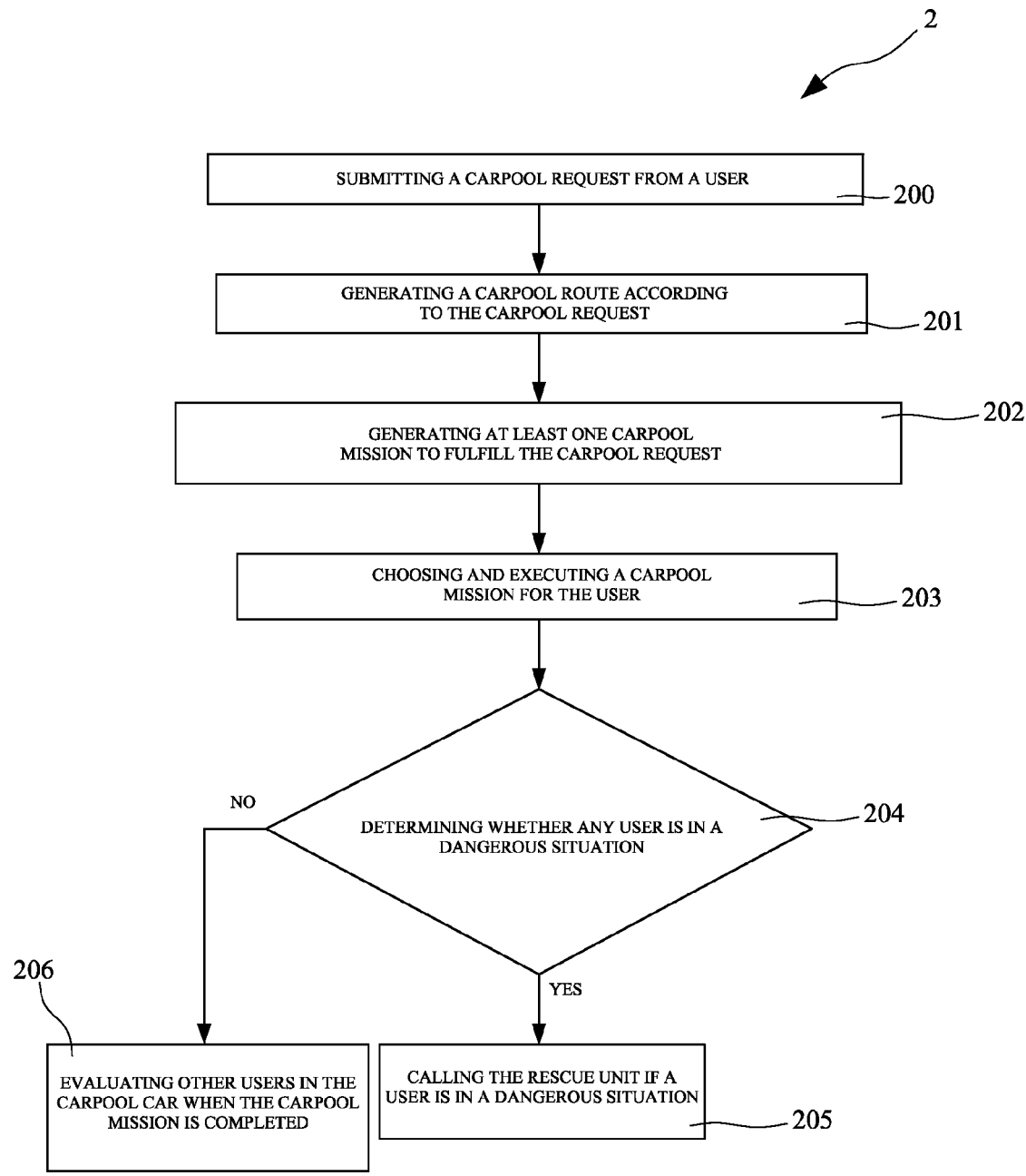
FIG. 3 is a flowchart of a second embodiment of an operational method for a high safety vehicular transportation system in accordance with the present invention.

With further reference to FIGS. 2 and 3, an operational method for a high safety vehicular transportation system (2) consisting of a user module, a rescue unit and a server center, is used in at least one carpool car with at least one user and comprises steps of (200) submitting a carpool request from a user, (201) generating a carpool route according to the carpool request, (202) generating at least one carpool mission to fulfill the carpool request, (203) choosing and executing a carpool mission for the user, (204) determining whether any user is in a dangerous situation, (205) calling the rescue unit if a user is in a dangerous situation and (206) optionally evaluating other users in the carpool car when the carpool mission is completed.

In step (200) of submitting a carpool request by a user, the carpool request may have name, gender, interest and evaluation of the user in the carpool car and departure location, destination and a number of passengers.

The step (202) is calculating the approximately optimal solution.

Figure 4:
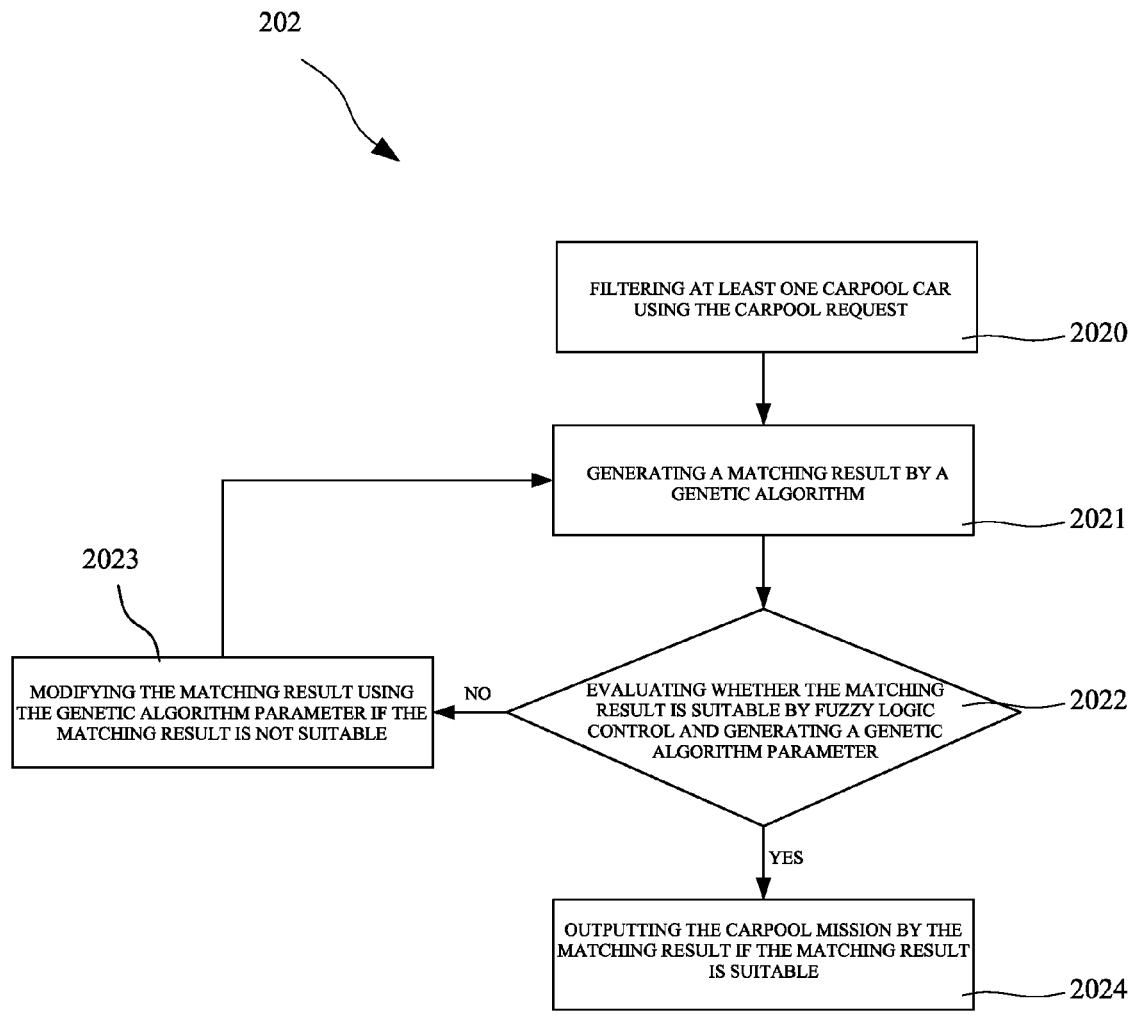
FIG. 4 is a flowchart of step 202 in FIGS. 2 and 3.

With further reference to FIG. 4, step (202) comprises steps of (2020) filtering at least one carpool car using the carpool request, (2021) generating a matching result by a Genetic Algorithm, (2022) evaluating whether the matching result is suitable by Fuzzy Logic Control and generating a Genetic Algorithm parameter, (2023) modifying the matching result using the Genetic Algorithm parameter if the matching result is not suitable and (2024) outputting the carpool mission by the matching result if the matching result is suitable. The carpool mission may have name, gender, interest and evaluation of other users in the carpool car.

In step (2021) of generating a matching result by a Genetic Algorithm, the matching result is generated by the Genetic Algorithm and the Fuzzy Logic Control, the request of the user is encoded in the form of a chromosome-like structure, and then routing evolution will be executed through the crossover and mutation operations, and then using the fitness function to evaluate the distance of routing to find the chromosome with the least distance as the parents and generating the better offspring after evolution process, in the end, to find the approximately optimal solution as the carpool match result.

In step (2022) and step (2023), the Fuzzy Logic Control is used to adaptively adjust the Genetic Algorithm parameter, evaluating the characteristic of match result by the Fuzzy Control Logic Algorithm and generating the change of crossover rate and mutation rate of Genetic Algorithm parameter in order to speed up the convergence of the evolutionary processes and improve the performance and reduce the computing time.

In step (204) of determining whether any user is in a dangerous situation, the dangerous situation may be the carpool car not complying with the carpool route or any user calling for help through the user module.

In step (205) of calling for a rescue unit if any user is in a dangerous situation, the rescue unit may be a police office.

Figure 5:
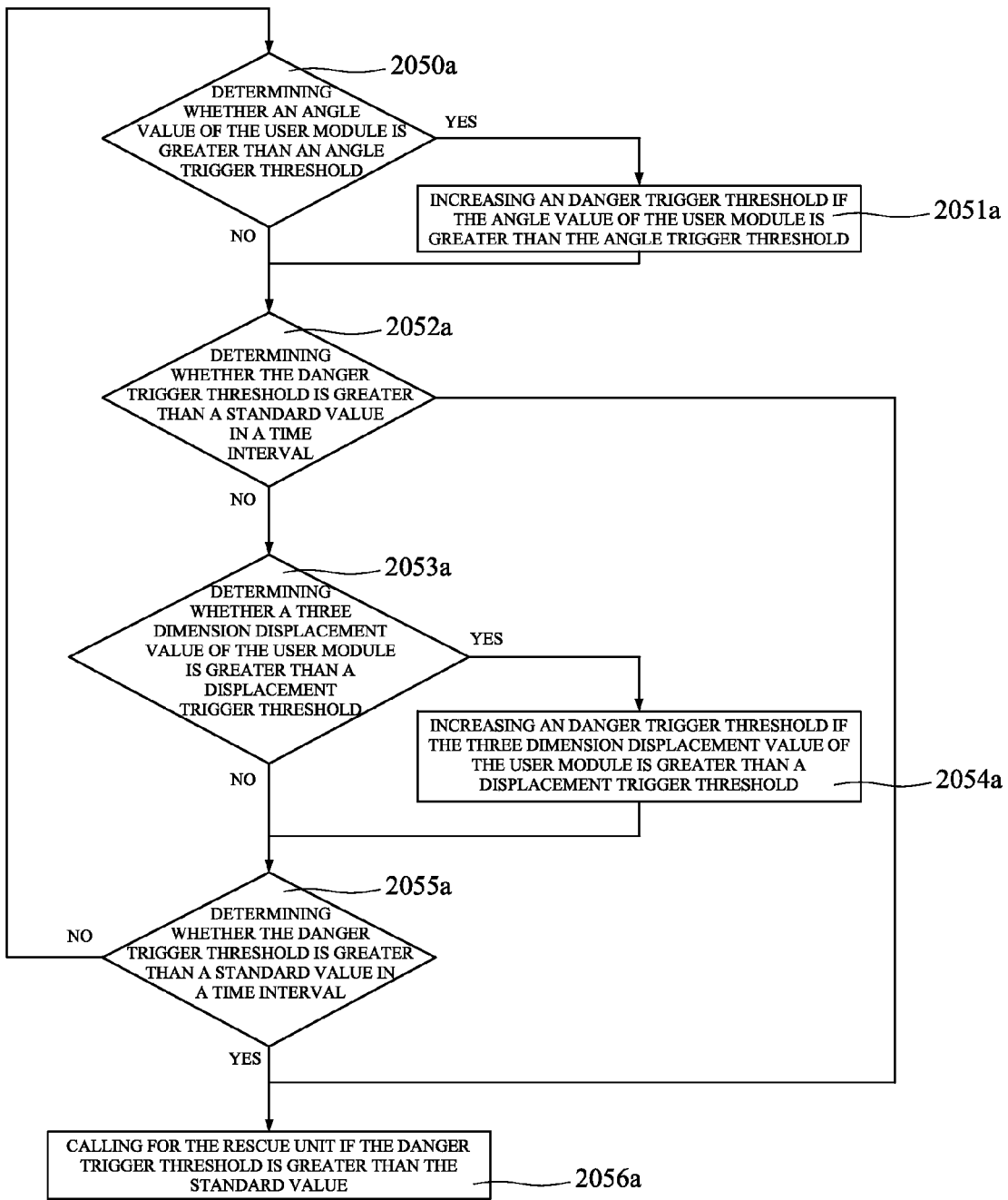
FIG. 5 is a flowchart of a first embodiment of step 205 in FIGS. 2 and 3.

With further reference to FIG. 5, step (205) further comprises steps of (2050a) determining whether an angle value of the user module is greater than an angle trigger threshold, (2051a) increasing an danger trigger threshold if the angle value of the user module is greater than the angle trigger threshold, (2052a) determining whether the danger trigger threshold is greater than a standard value in a time interval, (2053a) determining whether a three dimension displacement value of the user module is greater than a displacement trigger threshold, (2054a) increasing an danger trigger threshold if the three dimension displacement value of the user module is greater than a displacement trigger threshold, (2055a) determining whether the danger trigger threshold is greater than a standard value in a time interval and (2056a) calling for the rescue unit if the danger trigger threshold is greater than the standard value.

Figure 6:
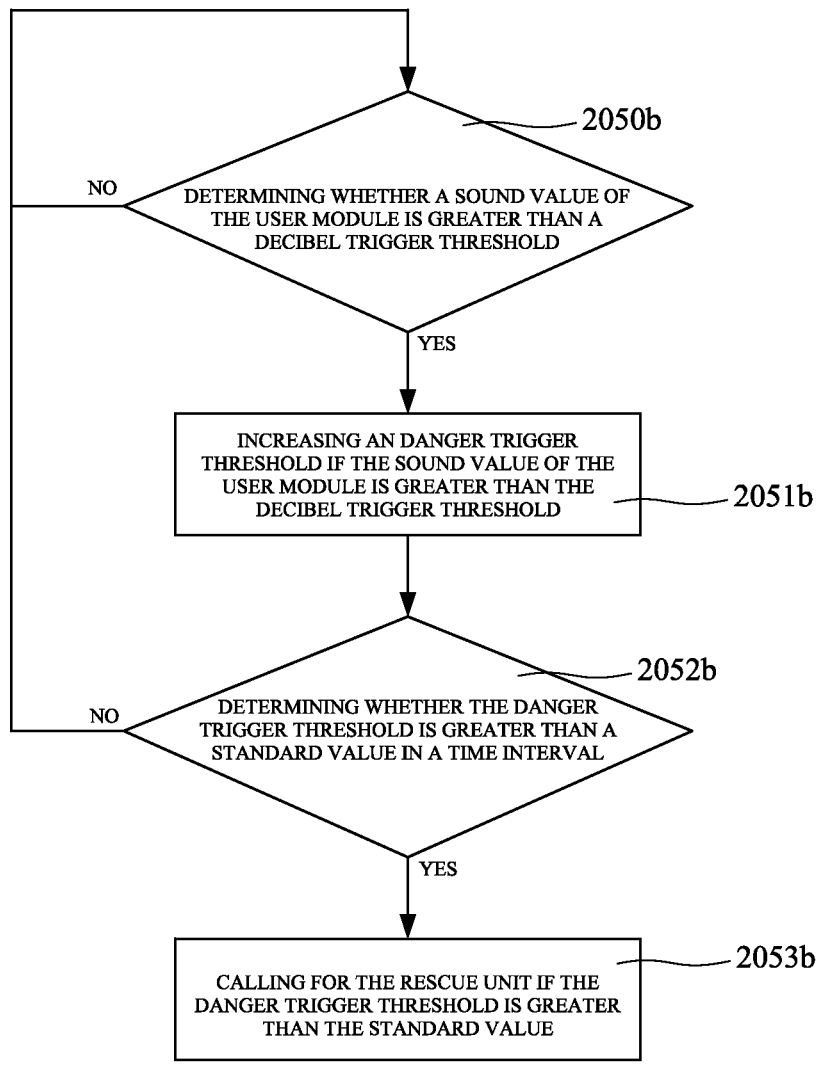
FIG. 6 is a flowchart of a second embodiment of step 205 in FIGS. 2 and 3.

With further reference to FIG. 6, step (205) further comprises steps of (2050b) determining whether a sound value of the user module is greater than a decibel trigger threshold, (2051b) increasing an danger trigger threshold if the sound value of the user module is greater than the decibel trigger threshold, (2052b) determining whether the danger trigger threshold is greater than a standard value in a time interval and (2053b) calling for the rescue unit if the danger trigger threshold is greater than the standard value.

Various changes can be made without departing from the broad spirit and scope of the invention.

What is claimed is:

1. A high safety vehicular transportation system for serving a user in an individual carpool car, comprising:
    a user module, configured for storing and providing carpool data, storing and providing states of individual carpool cars, and submitting a carpool request, wherein the user module comprises:
        a save our soul (SOS) system, configured for transmitting a distress signal;
        an acceleration unit, configured for measuring an angle value and a three dimension displacement value; and
        a counter, configured for having a time interval and a danger trigger threshold;
    a rescue unit connected to the user module and not in the carpool car, and configured for providing an emergency rescue assistance when the user is in a dangerous situation; and
    a server center connected to the user module and the rescue unit, receiving, and configured for storing and providing the carpool data, having an instantaneous tracking capability, providing a carpool service to the user, calling the rescue unit when the server center receiving the distress signal, receiving the carpool request, generating a carpool mission to fulfill the carpool request and transmitting the carpool mission to the user module, wherein the server center performs functions of calling the rescue unit when receiving the distress signal from the SOS system by a shaking of instinct from the user comprising:
        determining by the user module whether the angle value of the user module is greater than an angle trigger threshold, the user module increasing the danger trigger threshold when the angle value of the user module is greater than the angle trigger threshold, the user module determining whether the danger trigger threshold is greater than a standard value in the time interval, the user module determining whether the three dimension displacement value of the user module is greater than a displacement trigger threshold, the user module increasing the danger trigger threshold when the three dimension displacement value of the user module is greater than the displacement trigger threshold, the user module determining whether the danger trigger threshold is greater than the standard value in the time interval, and the user module calling for the rescue unit when the danger trigger threshold is greater than the standard value.

2. The high safety vehicular transportation system as claimed in claim 1, wherein the user module is a mobile device, comprises a global positioning system navigation device, an identification and an sound input unit, and is configured for:
    manually turning on the SOS system by the user, connecting to an Internet, and using an operation of instinct to transmit the distress signal to the server center for calling the rescue unit when the server center receiving the distress signal.

3. The high safety vehicular transportation system as claimed in claim 1, wherein the user module is a cell phone and comprises a global positioning system navigation device, an identification and an sound input unit and is configured for: manually turning on the SOS system by the user, connecting to an Internet, and using an operation of instinct to transmit the distress signal to the server center for calling the rescue unit when the server center receiving the distress signal.

4. The high safety vehicular transportation system as claimed in claim 1, wherein the user module is a tablet personal computer, comprises a global positioning system navigation device, an identification and an sound input unit, and is configured for: manually turning on the SOS system by the user, connecting to an Internet, and using an operation of instinct to transmit the distress signal to the server center for calling the rescue unit when the server center receiving the distress signal.

5. The high safety vehicular transportation system as claimed in claim 1, wherein the user module is a laptop computer, comprises a global positioning system navigation device, an identification and an sound input unit, and is configured for: manually turning on the SOS system by the user, connecting to an Internet, and using an operation of instinct to transmit the distress signal to the server center for calling the rescue unit when the server center receiving the distress signal.

6. The high safety vehicular transportation system as claimed in claim 1, wherein the SOS system is automatically turned on when the user gets into the carpool car, and an operation of instinct to transmit the distress signal for the emergency rescue assistance when the dangerous situation occurred.

7. The high safety vehicular transportation system as claimed in claim 1, wherein the server center listens for the carpool request sent from the user module at any time, calculates a matching result and returns the matching result back to the user module sending the carpool request.

8. The high safety vehicular transportation system as claimed in claim 1, wherein
    the carpool request comprises name, gender, interest and evaluation of the user in the carpool car and departure location, destination, a number of passengers, position of the carpool car and destination of the carpool car; and
    the server center dispatches the carpool mission, generates a carpool route according to the departure location, destination, position of the carpool car and destination of the carpool car and provides safety for the user in the carpool car.

9. The high safety vehicular transportation system as claimed in claim 8, wherein the carpool route is generated by a technique selected from a group consisting of a Monte Carlo Algorithm, a Simulated Annealing Algorithm, a Genetic Algorithm, a Fuzzy Logic Control, a Tabu Search, an ANT Algorithm, a Neural Networks and a Particle Swarm Optimization.

10. The high safety vehicular transportation system as claimed in claim 9, wherein the steps of generating the matching result by the Genetic Algorithm comprise:
    generating the matching result by the Genetic Algorithm and the Fuzzy Logic Control;
    encoding the carpool request of the user in the form of a chromosome-like structure;
    executing a routing evolution through a crossover operation and a mutation operation;
    evaluating a distance of the carpool routing by using a fitness function to find a chromosome with a least distance as parents and generating a better offspring after the routing evolution; and
    finding an approximately optimal solution as the carpool matching result.

11. the high safety vehicular transportation system as claimed in claim 10, wherein the Fuzzy Logic Control is used to adaptively adjust a Genetic Algorithm parameter, evaluating a characteristic of the carpool matching result by the Fuzzy Control Logic Algorithm and generating a change of a crossover rate and a mutation rate of the Genetic Algorithm parameter.

12. The high safety vehicular transportation system as claimed in claim 1, wherein the SOS system transmits the distress signal for calling the rescue unit by using a shouting of instinct.

13. The high safety vehicular transportation system as claimed in claim 12, wherein the shouting of instinct is the user shouting the user module, and the user module further comprises:
- a sound input unit which receives a sound value, wherein the danger trigger threshold increases when the sound value is greater than a decibel trigger threshold, and when the danger trigger threshold is greater than a standard value, the SOS system transmitting the distress signal to the server center.

14. An operational method for a high safety vehicular transportation system comprising a user module, a rescue unit and a server center, used in a carpool car with a user, and comprising the steps of
- submitting a carpool request from the user;
- generating a carpool route according to the carpool request;
- generating a carpool mission to fulfill the carpool request;
- choosing and executing the carpool mission for the user;
- determining whether the user is in a dangerous situation, wherein the dangerous situation is the user calling for help through the user module; and
- the user module calling the rescue unit when the user is in the dangerous situation, wherein the steps of calling the rescue unit comprise:
    - determining whether an angle value measured by an acceleration unit of the user module is greater than an angle trigger threshold;
    - increasing an danger trigger threshold when the angle value measured by the acceleration unit of the user module is greater than the angle trigger threshold;
    - determining through a counter of the user module whether the danger trigger threshold is greater than a standard value in a time interval;
    - determining whether a three dimension displacement value measured by the acceleration unit of the user module is greater than a displacement trigger threshold;
    - increasing an danger trigger threshold when the three dimension displacement value measured by the acceleration unit of the user module is greater than a displacement trigger threshold;
    - determining through the counter of the user module whether the danger trigger threshold is greater than a standard value in the time interval; and
    - calling for the rescue unit by a save our soul (SOS) system when the danger trigger threshold is greater than the standard value.

15. The operational method for a high safety vehicular transportation system as claimed in claim 14, wherein the step of generating the carpool mission to fulfill the carpool request comprises:
- calculating a approximately optimal solution.

16. The operational method for a high safety vehicular transportation system as claimed in claim 14, wherein the steps of calling for the rescue unit comprises:
- determining whether a sound value of the user module is greater than a decibel trigger threshold;
- increasing an danger trigger threshold when the sound value of the user module is greater than the decibel trigger threshold;
- determining whether the danger trigger threshold is greater than a standard value in the time interval; and
- calling for the rescue unit when the danger trigger threshold is greater than the standard value.

17. The operational method for a high safety vehicular transportation system as claimed in claim 14, wherein the steps of generating the carpool mission to fulfill the carpool request comprises:
- filtering the carpool car using the carpool request;
- generating a matching result by a Genetic Algorithm;
- evaluating whether the matching result is suitable by Fuzzy Logic Control and generating a Genetic Algorithm parameter;
- modifying the matching result using the Genetic Algorithm parameter when the matching result is not suitable; and
- outputting the carpool mission by the matching result when the matching result is suitable.

* * * * *